United States Patent [19]
Dragone

[11] Patent Number: 6,049,644
[45] Date of Patent: Apr. 11, 2000

[54] OPTICAL ROUTING DEVICE HAVING A SUBSTANTIALLY FLAT PASSBAND

[75] Inventor: Corrado Dragone, Little Silver, N.J.

[73] Assignee: Lucent Technologies Inc., Murray Hill, N.J.

[21] Appl. No.: 08/855,337

[22] Filed: May 13, 1997

[51] Int. Cl.⁷ ..................................................... G02B 6/26
[52] U.S. Cl. ................................ 385/37; 385/46; 385/24
[58] Field of Search .................................. 385/37, 46, 43, 385/45, 38, 24

[56] References Cited

U.S. PATENT DOCUMENTS

| | | | |
|---|---|---|---|
| 4,603,943 | 8/1986 | Okoshi | 350/96.3 |
| 4,904,042 | 2/1990 | Dragone | 350/96.16 |
| 5,002,350 | 3/1991 | Dragone | 350/96.15 |
| 5,039,993 | 8/1991 | Dragone | 343/776 |
| 5,136,671 | 8/1992 | Dragone | 385/46 |
| 5,400,421 | 3/1995 | Takahashi | 385/24 |
| 5,412,744 | 5/1995 | Dragone | 385/24 |
| 5,425,116 | 6/1995 | Dragone | 385/24 |
| 5,467,418 | 11/1995 | Dragone | 385/37 |
| 5,488,680 | 1/1996 | Dragone | 385/24 |
| 5,625,723 | 4/1997 | Dragone | 385/11 |
| 5,745,619 | 4/1998 | Li et al. | 385/45 |

OTHER PUBLICATIONS

C. Dragone, *An NxN Optical Multiplexer Using a Planar Arrangement of Two Star Couplers*, IEEE Photon. Technol. Lett., 3, pp. 812–815 (1991).

*Primary Examiner*—Hung N. Ngo

[57] ABSTRACT

An optical apparatus having a specifiable passband width comprises a first free space region that has at least one input port configured to receive light waves traveling through a first waveguide coupled to the input port. The first waveguide further comprises a longitudinal slot that has a given length, L, and width, S, so as to produce the specifiable passband width. The optical apparatus further includes an optical grating that has a plurality of waveguides connected to the first free space region with the optical grating defined by a plurality of unequal length waveguides. A second free space region is coupled to the optical grating so as to receive light traveling through the optical grating. The second free space region further has at least one output port configured to provide light waves to a second waveguide coupled to the output port.

30 Claims, 8 Drawing Sheets

OPTICAL ROUTING DEVICE HAVING A SUBSTANTIALLY FLAT PASSBAND

FIELD OF THE INVENTION

This invention relates to an optical interconnection device, and specifically to a wavelength router that has a wide and substantially flat passband.

BACKGROUND OF THE INVENTION

Optical switching, multiplexing, and demultiplexing have been accomplished in the past by using an interconnection apparatus having a plurality of closely spaced input waveguides communicating with the input of a star coupler. The output of the star coupler communicates with an optical grating comprising a series of optical waveguides, each of the waveguides differing in length with respect to its nearest neighbor by a predetermined fixed amount. The grating is connected to the input of a second star coupler, the outputs of which form the outputs of the switching, multiplexing, and demultiplexing apparatus. An example of such an interconnection apparatus is disclosed in U.S. Pat. Nos. 5,002,350 and 5,136,671.

FIG. 1a illustrates a prior art optical interconnection apparatus. The geometry of such an apparatus may be such that a plurality of separate and distinct wavelengths each launched into a separate and distinct input port of the apparatus will all combine and appear on a predetermined one of the output ports. In this manner, the apparatus performs a multiplexing function. The same apparatus may also perform a demultiplexing function. In this situation, a plurality of input wavelengths launched into one of the input ports is separated from each other and each wavelength is directed to a predetermined one of the output ports of the apparatus.

The apparatus of FIG. 1a may also be employed as a wavelength router in an optical network so as to efficiently drop and add optical channels at various cross connect points. A particular channel may have to pass through several routers without regeneration before leaving the network. Thus, a maximally flat passband is desirable for each router. The required flatness then depends on the largest number of routers that are concatenated. For instance, the passband ripple for each router should preferably stay below a few tenths of a decibel, if more than 10 filters are concatenated. Thus there is a need for an arrangement for obtaining a relatively small ripple over a wide passband.

One approach for achieving a wider passband is described in the U.S. Pat. No. 5,412,744, issued May 2, 1995 for a "frequency Routing Device Having a Wide and Substantially Flat Passband." Basically, a Y-branch coupler is connected to the remote ends of two adjacent waveguides, wherein the waveguides are located a predetermined distance apart to produce a given passband width. As will be explained in more detail below, the Y-branch coupler allows for a substantially wider passband. However, there are certain disadvantages with employing the Y-branch coupler. For example, because optical signal traveling through a Y-branch generates unwanted transmission components, the length of the Y-branch coupler must be long enough so that the undesirable components do not reach the wavelength router. Furthermore, the gap between the two branches of the Y coupler is in the order of 3–5 microns. The relatively long length and substantially small gap between the branches lead to undesired fabrication errors, which are difficult to overcome.

Thus, there is a need for a wavelength router that has a substantially wide passband, without the disadvantages of prior art systems.

SUMMARY OF THE INVENTION

In accordance with one embodiment of the present invention an optical apparatus comprises a first free space region configured to receive radiation from at least one waveguide. The first free space region includes at least one input port for receiving light from one of said waveguides. An optical grating comprising a plurality of waveguides are also connected to the first free space region. The optical grating is defined by a plurality of unequal length waveguides. The grating is connected to a second free space region configured to at least one waveguide which is connected to the second free space region. A coupling waveguide is connected to an input port of the first free space. The coupling waveguide includes a longitudinal slot, having a given length, L, and thickness, S, so as to produce a specifiable passband width.

BRIEF DESCRIPTION OF THE DRAWINGS

The subject matter regarded as the invention is particularly pointed out and distinctly claimed in the concluding portion of the specification. The invention, however, both as to organization and method of operation, together with features, objects, and advantages thereof may best be understood by reference to the following detailed description when read with the accompanying drawings in which:

FIG. 1b are plots illustrating the transmission coefficients of the wavelength router illustrated in FIG. 1a.

DETAILED DESCRIPTION OF THE DRAWINGS

Figure 1A:
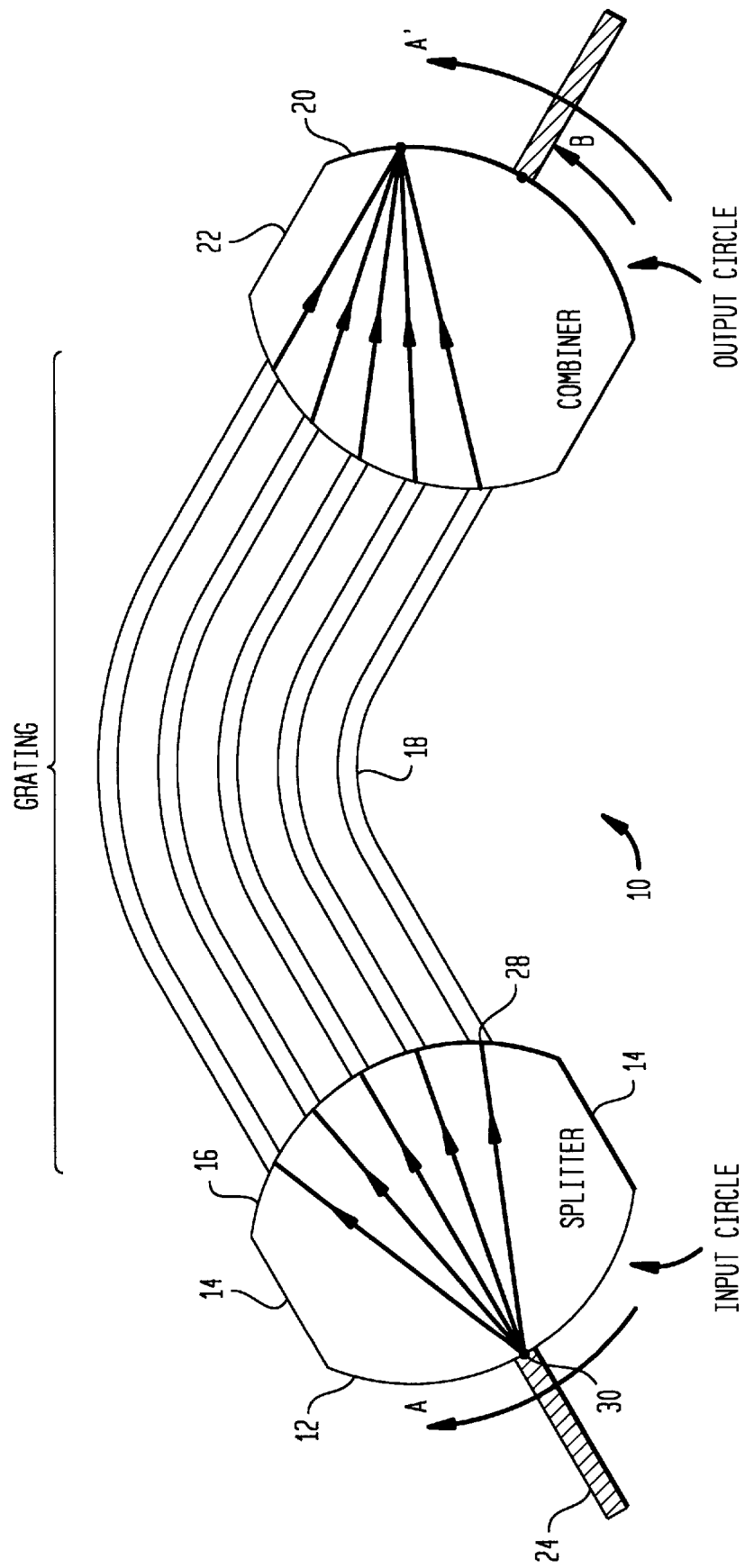
FIG. 1a illustrates a prior art wavelength router.

FIG. 1a illustrates a prior art wavelength router 10. Wavelength router 10 is an imaging arrangement comprising a splitter 14, an optical grating 18 comprising an array of M waveguides or arms, and a combiner 22. Arms 18 have a constant path length difference. Splitter 14 is made of a dielectric slab that forms a free-space region that is configured to receive a radiated power flowing in an input waveguide 24 to its input port 30 disposed at input circle 12. Similarly, combiner 22 is made of a dielectric slab that forms a free-space region that is configured to provide the received power to an output waveguide, 26 via an output port disposed at output circle 20. Although FIG. 1*a* illustrates one input port and one output port, it is to be understood that a typical wavelength router includes many ports.

In an embodiment with many input and output ports, routing device 10 operates as a multiplexer or a demultiplexer of optical frequencies. For example, if a signal of amplitude P is applied to input port 30, then signals of amplitude $PT_{1l}, \ldots PT_{12}, \ldots PT_{1N}$ are produced at the output ports, where $T_{ik}$ is the value of the transmission coefficient for input port "I" and output port "k."

Figure 1B:
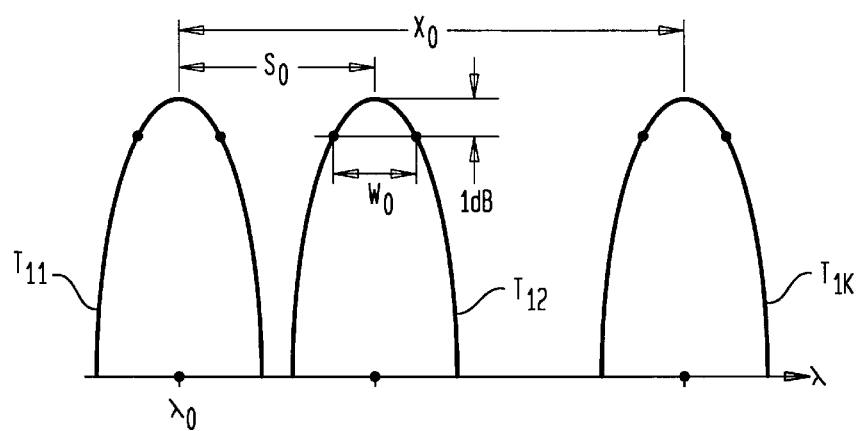

The typical behavior of routing device 10 is illustrated in FIG. 1*b*. This figure shows the set of transmission coefficients $T_{ik}$ for the routing device for a particular input port 30 as a function of wavelength λ. The channel spacing $S_o$ indicated in FIG. 1*b* is defined as the wavelength separation between maximum peaks of adjacent transmission coefficients. The variation of each transmission coefficient as a function of wavelength is essentially periodic with a period $X_o$, which is often referred to as the free spectral range of the device. The wavelengths $\lambda_o, \lambda_1, \ldots, \lambda_k$ of maximum transmission for each of the transmission coefficients are referred to as the center wavelengths. The transmission coefficients are substantially equal to unity at the center wavelengths if certain inherent losses are ignored.

Referring to FIG. 1*a*, during operation, the input power of a signal having a particular wavelength flows through an input waveguide, such as 24, and is transferred by splitter 14 to M waveguides 18, and is then transferred to the output of router 10. It is noted that in a typical application, waveguide 24 may carry a plurality of signals having various wavelengths. However, the discussion herein with reference to FIG. 1*a* is limited to a transmission of one signal with a particular wavelength. The output signal from splitter 14 is a sum of M optical components, each corresponding to a particular arm. One of the properties of routing device 10 is that the output wave illuminating output circle 20 is an image, which is a filtered replica of the input wave. Furthermore, the location of image A' on output circle 20 varies periodically with the wavelength of the transmitted signal. Thus, maximum transmission is achieved at the wavelength for which the image is produced at the output waveguide location B. The periodic behavior of the transmission coefficients as a function of wavelength is the result of the constant path length difference of the arms. This period is defined as free-spectral range, as explained in detail in C. Dragone, "An N×N Optical Multiplexer Using a Planar Arrangement of Two Star Couplers, IEEE Photon. Technol. Lett., 3, pp. 812–815 (1991), and incorporated herein by reference.

Figure 2:
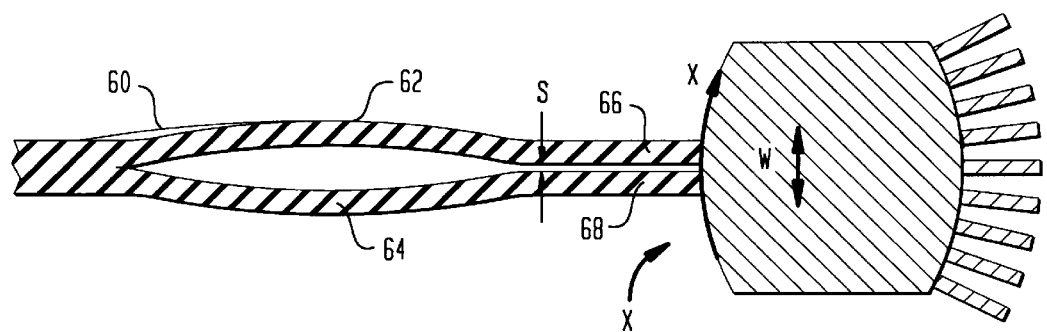
FIG. 2 illustrates a prior art waveguide arrangement employed so as to improve the transmission coefficients of a wavelength router.

As mentioned before, because many routing devices, such as 10, may be concatenated in a communications system, the transmission coefficient for a signal traveling from its starting input port to its final destination port is the product of transmission coefficients in each routing device. Thus, it is desirable to have routing devices that exhibit a substantially wide passband behavior. Previously, as discussed in U.S. Pat. No. 5,412,744 issued on May 2, 1995, and incorporated herein by reference, a wide passband was realized by splitting the input signal into two identical components, which were applied to different input ports of the router. FIG. 2 illustrates a prior art embodiment of such an arrangement for improving the transmission coefficient. Briefly, a Y-branch 60 (cross hatched) is connected to two input waveguides 62 and 64. The two input waveguides merge towards each other to define a gap S between the two at input ports 66 and 68. The gap S is in the order of few microns.

Figure 3:
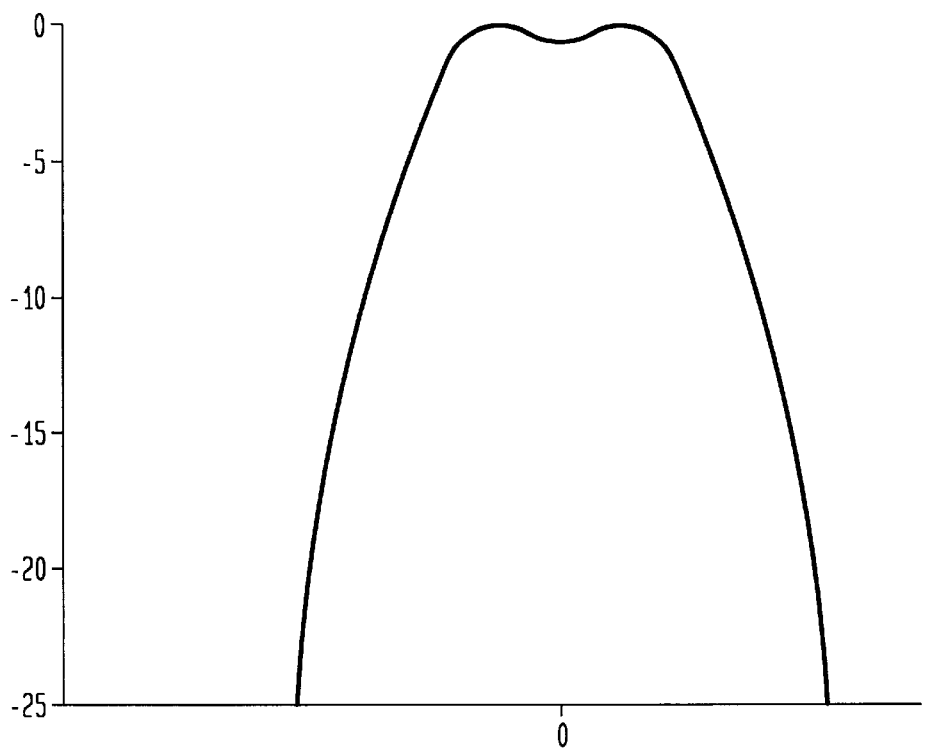
FIG. 3 is a plot of the resultant transmission coefficient of a wavelength router employing a waveguide arrangement as illustrated in FIG. 2.

The resulting transmission coefficient is a linear combination of individual transmission coefficients produced by the two waveguides. FIG. 3 is a plot of the resultant transmission coefficient, which represents a passband region with two distinct maxima separated by a minimum. The transmission coefficient is illustrated in decibel units and is plotted as a function of the normalized wavelength $$\frac{\lambda - \lambda_o}{\lambda_f}$$

where $\lambda_o$ is the wavelength at the center of the passband and $\lambda_f$ is the free-spectral range or period as explained before.

Figure 4:
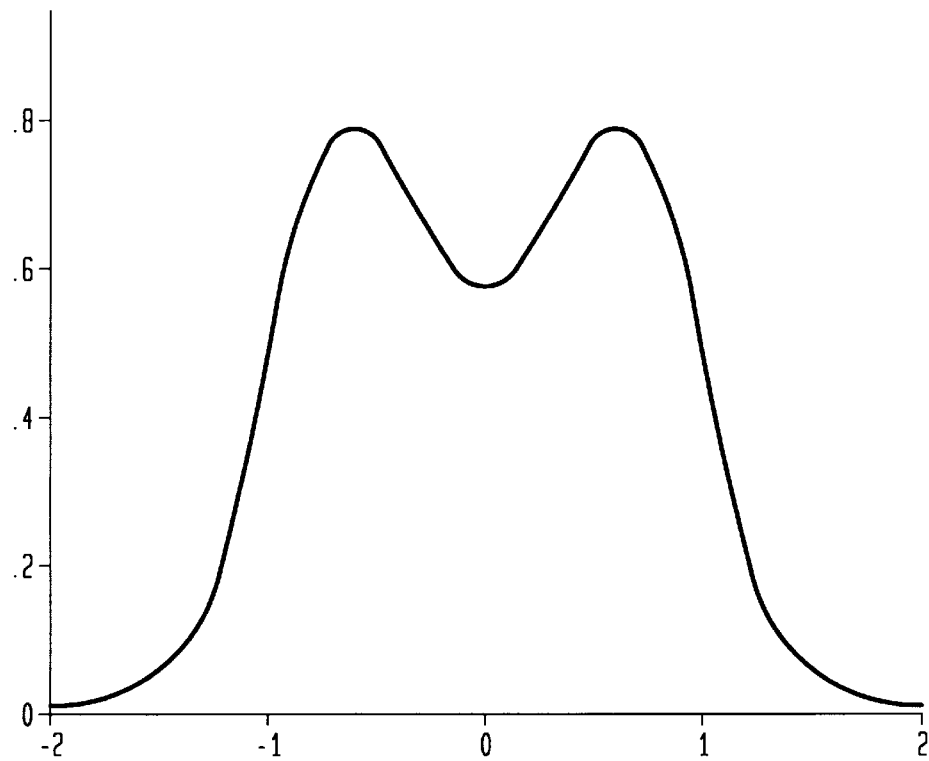
FIG. 4 illustrates an example of amplitude distribution produced at the input circle of a wavelength router that employs the waveguide arrangement of FIG. 2.

FIG. 4 illustrates an example of the amplitude distribution produced at the input circle of the router that employs the Y-branch arrangement of FIG. 2. The routing device produces a filtered replica of this distribution. The relatively small ripple as illustrated in FIG. 3 is obtained by properly choosing the width of the output waveguide, not shown in FIG. 2. As mentioned before, however, the Y-branch arrangements has certain features that may be less than satisfactory in certain applications, as explained hereinafter.

One disadvantage with the Y-branch arrangement is its distance from the input circle. Typically, the Y-branch is located at a substantially far distance from the input circle so as to minimize illumination of the input circle by scattered waves originated at the Y-branch. Thus, waveguides 62 and 64 (FIG. 2) extend a few millimeters. The extended length of the waveguides may cause difficulty in achieving a small gap, S, between the two waveguides with a high degree of accuracy. Any inaccuracies in the gap between the waveguides may result in the excitation of odd mode components of the transmitted optical wave. Furthermore, the passband ripple of the transmission coefficient also depends on the exact dimension of the gap, S, between the two waveguides. Thus, it is also difficult to produce a small ripple over a wide passband by employing the Y-branch arrangement of FIG. 2.

Figure 5:
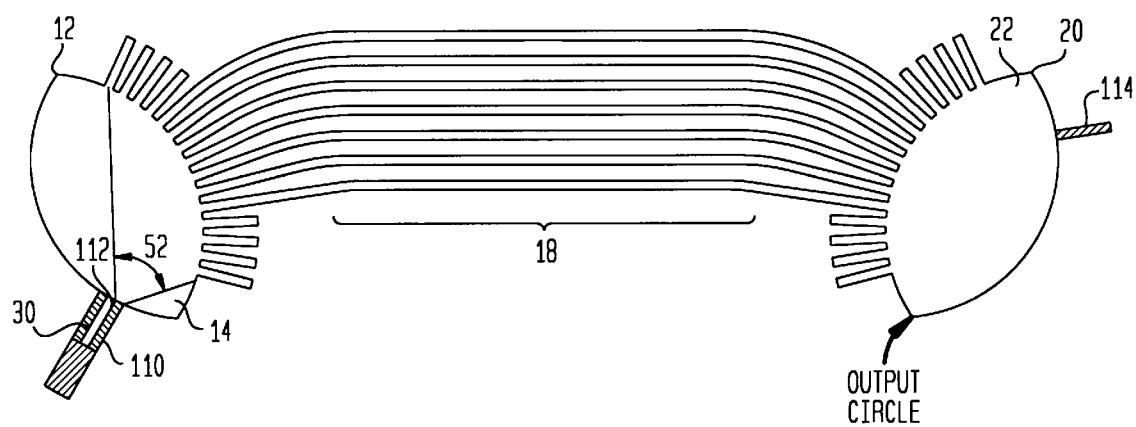
FIG. 5 illustrates an embodiment of a waveguide arrangement in accordance with the present invention.

FIG. 5 illustrates an embodiment of a waveguide 110 coupled to a routing device, such as 10, in accordance with the present invention. Waveguide 110 includes a longitudinal slot 112. The slot has a refractive index, $n_1$, which is lower than the refractive index, $n_2$, of the core of waveguide 110. The waveguide has a width, W. Furthermore, longitudinal slot 112 has a length, L, and a width, S. The refractive indices and the waveguide dimensions are determined based on design requirements. Waveguide 110 is coupled to an input port 30 disposed at input circle 12. The operation of waveguide 110 is described in more detail hereinafter.

Figure 6:
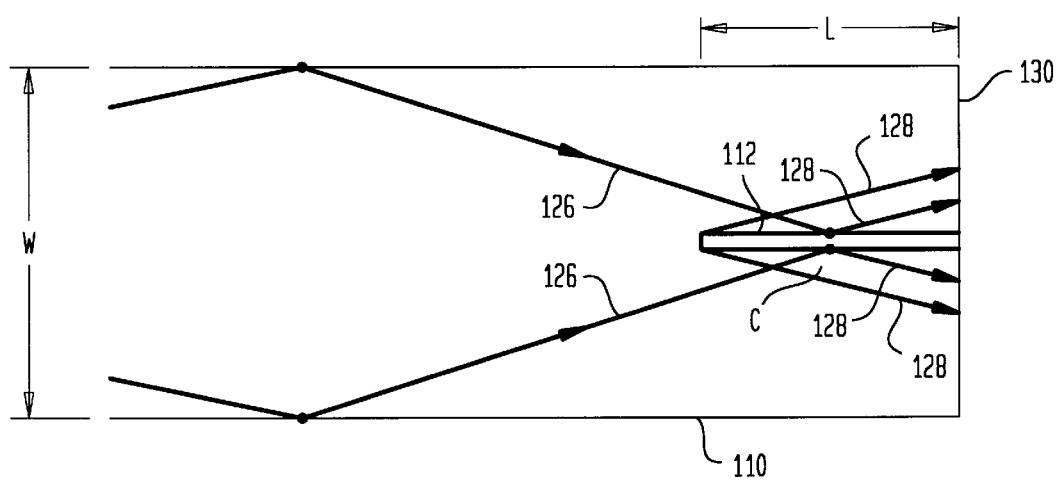
FIG. 6 illustrates the propagation of optical waves in a waveguide arrangement in accordance with one embodiment of the present invention.

The propagation of optical waves in the waveguide employing the principles of the present invention is described hereinafter. The following examples apply to silica waveguides with core refractive index of 1.4457 and effective index difference of 0.47% between core and cladding. However, it is noted that similar results may be obtained with other type of waveguides having appropriate dimensions. FIG. 6 illustrates a waveguide in accordance to one embodiment of the invention, such as 110. The incident rays that illuminate slot 112 define the waveguide fundamental mode, which consist of two plane waves reflected by the waveguide boundaries. The propagation directions of the two plane waves are shown by two incident rays 126 illuminating the center C of longitudinal slot 112. Incident waves reflecting from longitudinal slot 112 generate scattered rays 128 that propagate toward the output aperture 130 of waveguide 110. The resulting optical field distribution over the waveguide aperture at the end of slot 112 is illustrated in FIGS. 7 and 8, for different lengths, L, of slot 112.

Figure 7:
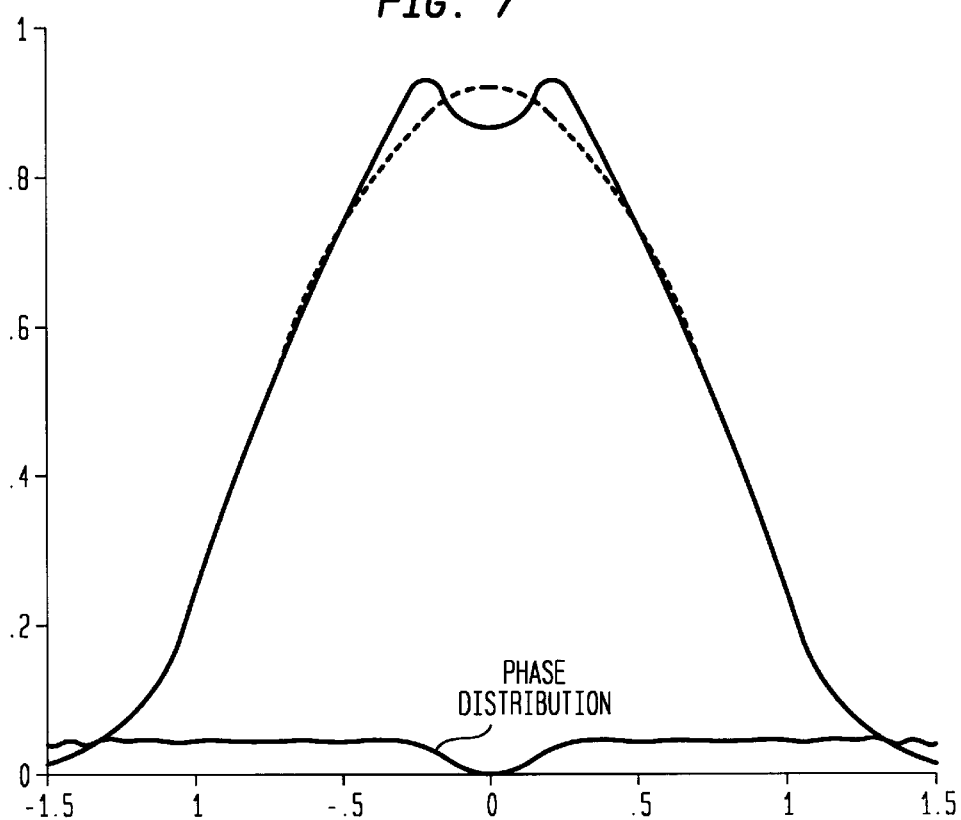
FIG. 7 is a plot of optical power distribution at the output aperture of a waveguide in accordance with one embodiment of the present invention.

FIG. 7 is a plot of optical power distribution at aperture 130 of waveguide 110, having a width W=20 µm, and a longitudinal slot having a width S=3 µm, and a length L=10 µm. Similarly, FIG. 8 is a plot of optical power distribution at aperture 130 of waveguide 110, having a width W=20 µm, and a longitudinal slot having a width S=3 µm, and a length L=20 µm. The dashed curve in both FIGS. 7 and 8 represent the distribution without the presence of longitudinal slot 112. As illustrated, the scattered wave reduces the amplitude of power at the center of the aperture, leading to a minimum between two maxima. The location of the maxima approximately corresponds to the scattered rays originating from the center C of slot 112. The amplitude difference between the two maxima and the minimum monotonically increases as the length L of slot 112 is increased. Meanwhile, the separation of the two maxima increases with an increase of length L.

It is noted that the scattered waves impinging on aperture 130 affect the phase of the optical wave transmitted in waveguide 110. As a result, curved phase fronts are produced in the vicinity of slot 112, causing power to flow away from slot 112. The resulting phase distributions over the waveguide aperture is also illustrated in FIGS. 7 and 8.

Figure 8:
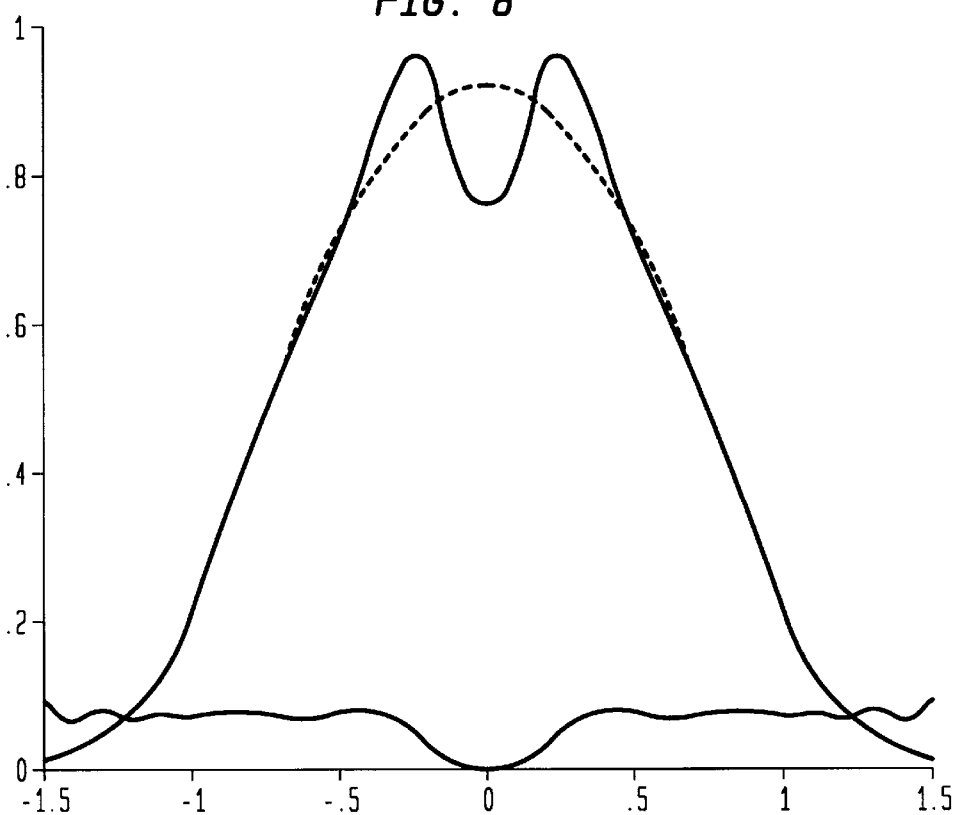
FIG. 8 is a plot of optical power distribution at the output aperture of a waveguide in accordance with another embodiment of the present invention.
Figure 9A:
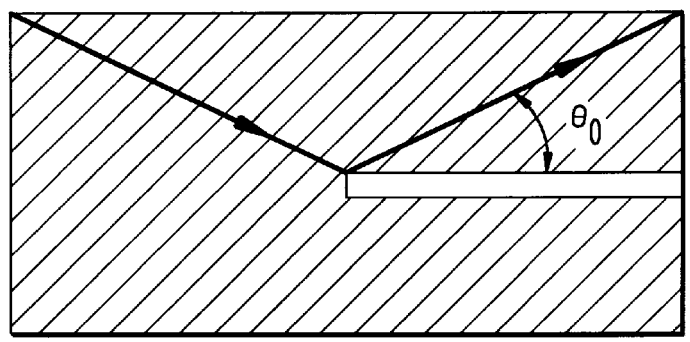
FIG. 9a illustrates a waveguide arrangement providing a maximum passband in accordance with one embodiment of the present invention.

Thus, according to the principles of the present invention as discussed in reference with FIGS. 6–8, the separation of the two maxima can be varied by varying the length L of slot 112. Maximum separation is obtained by choosing a long enough slot, such that the scattered wave reflecting from the slot fully illuminates the waveguide aperture 130, as illustrated in FIG. 9a. An estimate of the required length L is obtained by assuming that the angle $\Theta_0$ of the scattered rays is substantially equal to the angle of the incident rays. The required length is approximately $$L = \frac{W}{2\tan\Theta_o}$$

where W is the waveguide aperture width.

One of the parameters that determines the passband ripple, is the ratio between the maximum and minimum power amplitudes produced over the width W, of the waveguide aperture. This ratio can be varied by varying the width S of slot 112. For relatively small values of S, the ratio between the maximum and minimum power increases monotonically with S. Thus, by properly choosing the width S and the length L for a given aperture width W, it is possible to optimize the two maxima of input power distribution.

The possibility of optimizing the input power distribution by choosing both width S, and length L is an advantageous feature as compared to prior art Y-branch arrangements. As mentioned above in reference with FIG. 2, the input power distribution can be varied by only varying the gap S of the Y-branch for a given waveguide aperture width. As a result, the Y-branch arrangement may not produce a wide passband with negligible ripple, similar to the passband characteristics that result in accordance with one embodiment of the present invention.

Figure 9B:
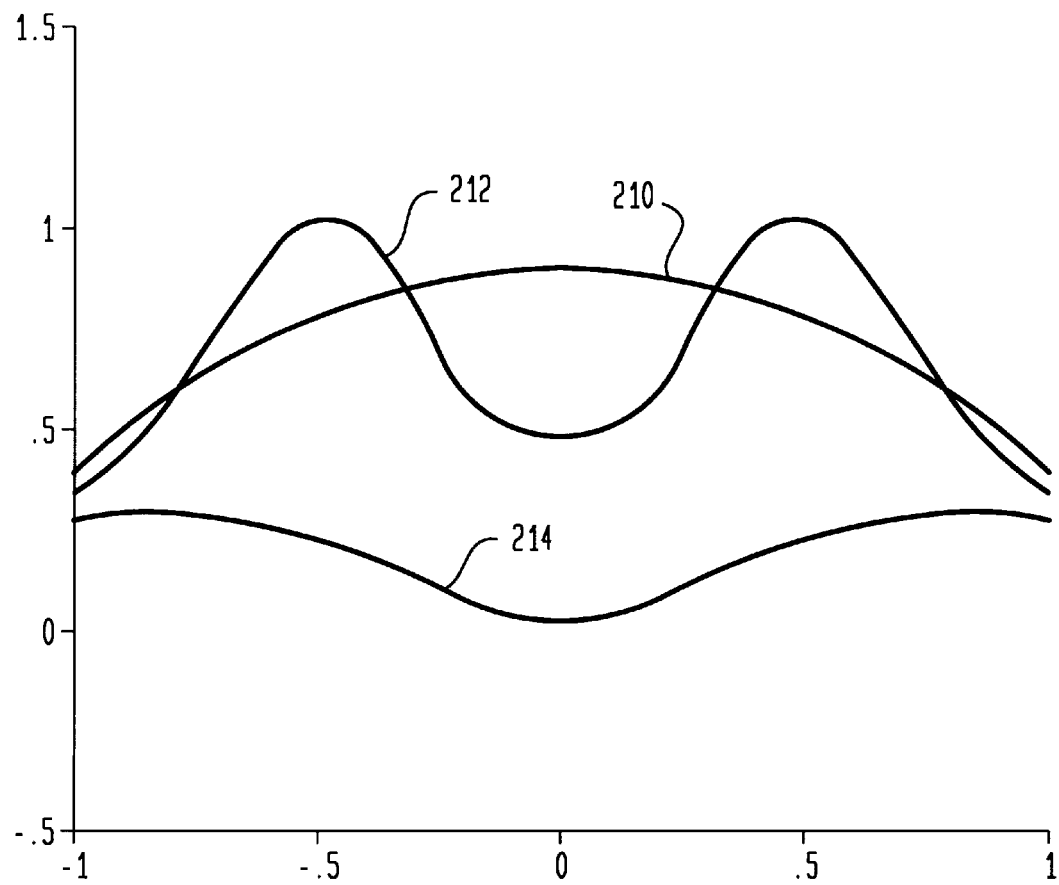
FIGS. 9b and 9c illustrate the characteristics of the waveguide arrangement illustrated in FIG. 9a in accordance with the present invention.
Figure 9C:
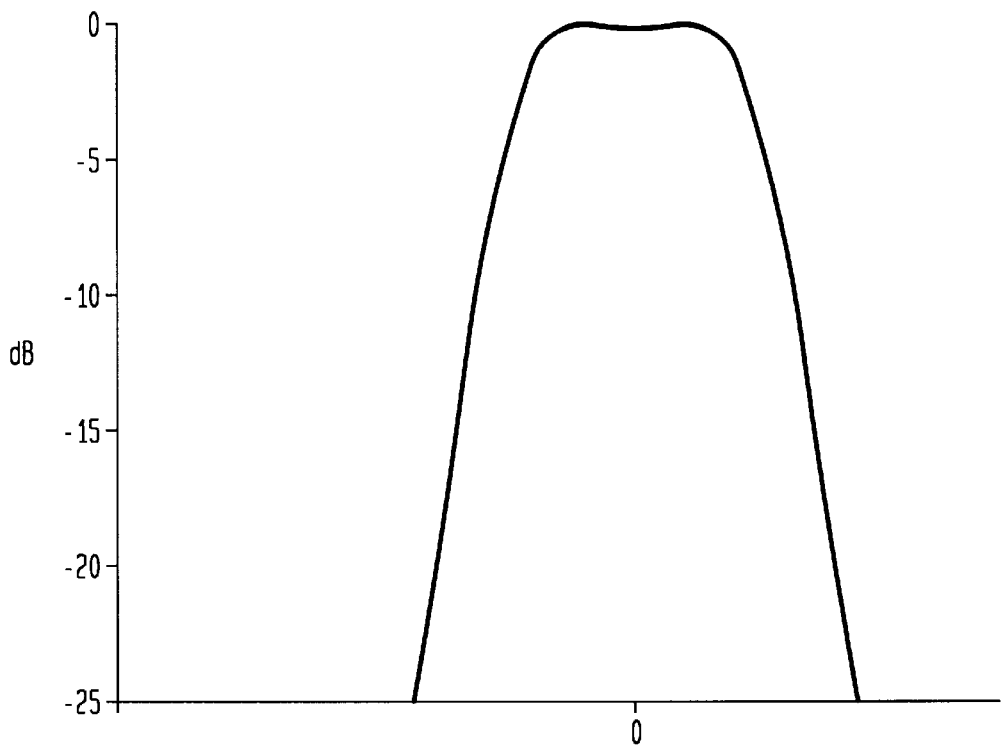

FIGS. 9b and 9c illustrate the characteristics of exemplary waveguide 110 coupled to a routing device, such as 10 having a length L that is configured to provide maximum separation between the two maximas of optical field distribution at the output aperture of waveguide 110. The width W of waveguide 110 for this example is 22 µm. The width S of elongated slot 112 is 5.5 µm. The length of slot 112 is 55 µm. The refractive index $n_1$ of the slot is 1.4457. The effective refractive index of the core index is $n_2=n_1+n_1 * 0.0047$. The number of waveguides N of grating 18 is 41. The angular aperture $\Omega$ is 0.1802 radians. The width of the receiving waveguide 114 coupled to the output circle of routing device 10 is 7 µm.

As illustrated in FIG. 9b the optical power distribution a the output aperture of waveguide 110, also referred to as the input waveguide mode, without the existence of slot 112 is shown as curve 210. The input optical power distribution after the addition of slot 112 is shown as curve 212, having desired maxima and minimum, based on the characteristics of the waveguide and the slot as specified in the present example. The input phase distribution is shown as curve 214. Furthermore, FIG. 9c is the plot of the transmission coefficient of the routing device of the present example.

Figure 10:
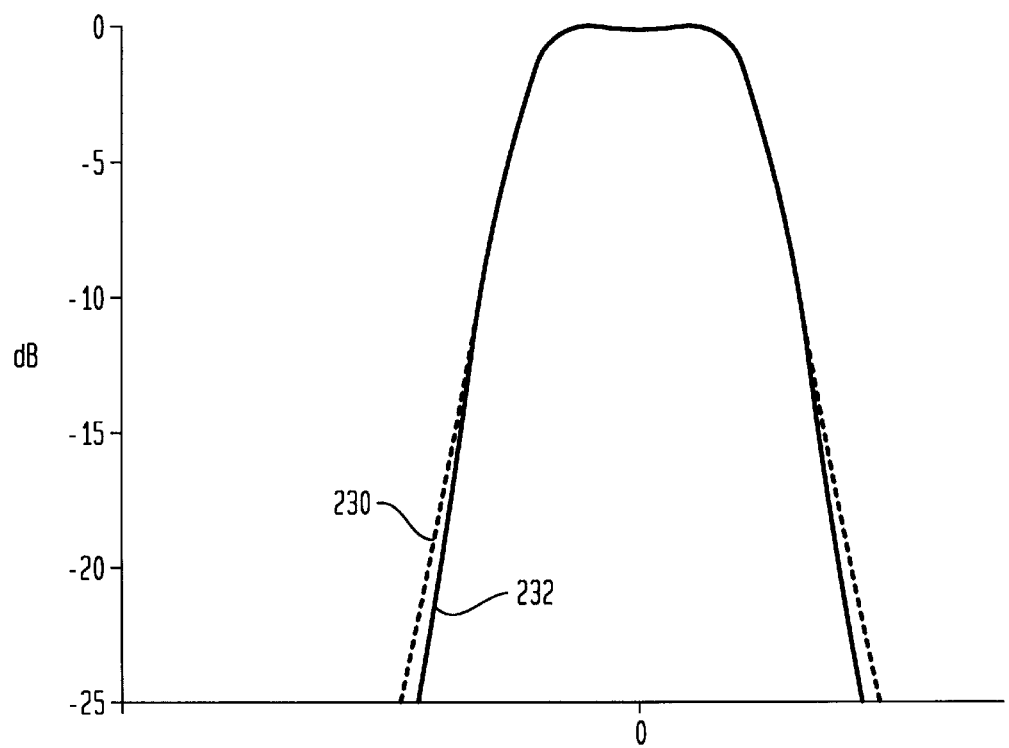
FIG. 10 illustrates a modified transmission coefficient obtained by phase compensation in accordance with the present invention.

As mentioned above, the waveguide arrangement in accordance with the present invention may cause a phase variation across the width of the output aperture of the waveguide, as explained in reference with FIGS. 7–9. This phase variation may sometimes affect the transmission coefficient of the routing device. In accordance with one embodiment of the present invention such phase variations may be substantially eliminated by introducing suitable path length corrections in the arms of the grating. The required corrections are typically small. For example, FIG. 10 illustrates a modified transmission coefficient after adjusting the lengths of the arms in the grating of the routing device. Thus, curve 230 illustrates the transmission coefficient with phase variations, and curve 232 illustrates the transmission coefficient after phase compensation.

The arrangement to introduce corrections in the gratings to substantially eliminate the phase variations is described in U.S. Pat. No. 5,625,723, issued Apr. 29, 1997 entitled "Method For Reducing Birefingence in Optical Gratings," (Dragone 44-6-2-2), and incorporated herein by reference. Basically, the correction represents approximately a periodic phase variation, properly chosen so as to minimize the transmission coefficient in the vicinity of the first two minima adjacent the main lobe in the corrected transmission coefficient. The two minima, not shown in FIG. 10, occur for $$\left|\frac{\lambda - \lambda_o}{\lambda_f}\right| \approx 0.22$$

Figure 11:
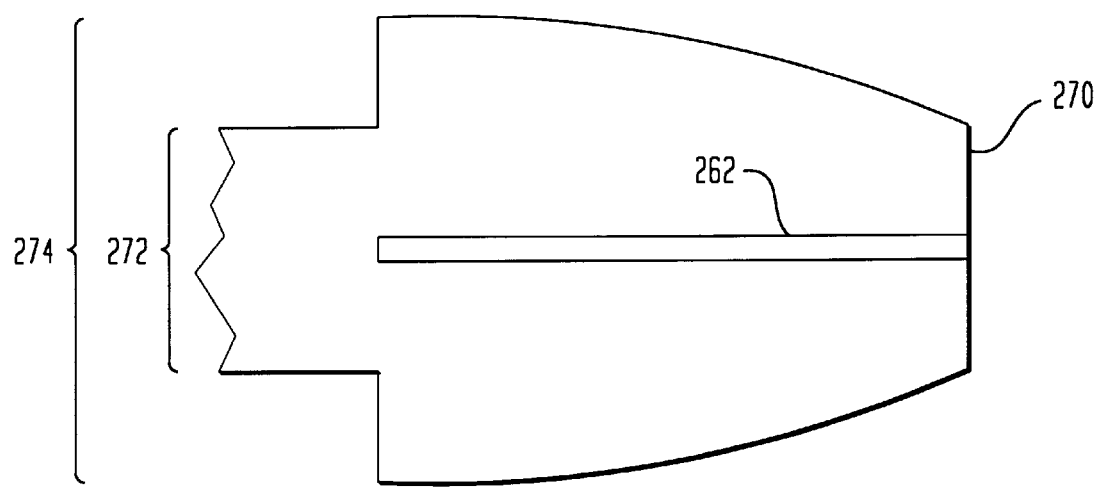
FIG. 11 illustrates a waveguide arrangement in accordance with one embodiment of the present invention.

It is noted that the performance of waveguide 110 in accordance with the present invention may be improved by including a variety of modifications, such as allowing the slot to have a nonuniform width, so as to improve the scattered wave distribution. In one embodiment of the present invention incident wave distribution is advantageously improved, by allowing the incident wave include higher order modes. Furthermore, in accordance with another embodiment of the invention the input waveguide is advantageously tapered by varying the width of the waveguide in the final section containing the slot so as to improve the aperture distribution in the vicinity of the edges. FIG. 11 illustrates a waveguide 260 in accordance with one embodiment of the invention, wherein the final section of the waveguide is tapered so as to improve the performance of the routing device 10. The tapered waveguide contains a suitable slot 262, properly positioned inside the waveguide. The width of aperture 270 and 272 is 22 µm. The width 274 of waveguide 260 is 30 µm. The length of slot 262 is 55 µm and the width, S, of slot 262 is 5.5 µm. In addition, the filtering in the arms of the grating of the routing device may be modified in accordance with the principles disclosed in the U.S. Pat. No. 5,467,418 entitled "Frequency Routing Device Having a Spatially Filtered Optical Grating For Providing an Increased Passband Width," incorporated herein by reference.

Figure 12:
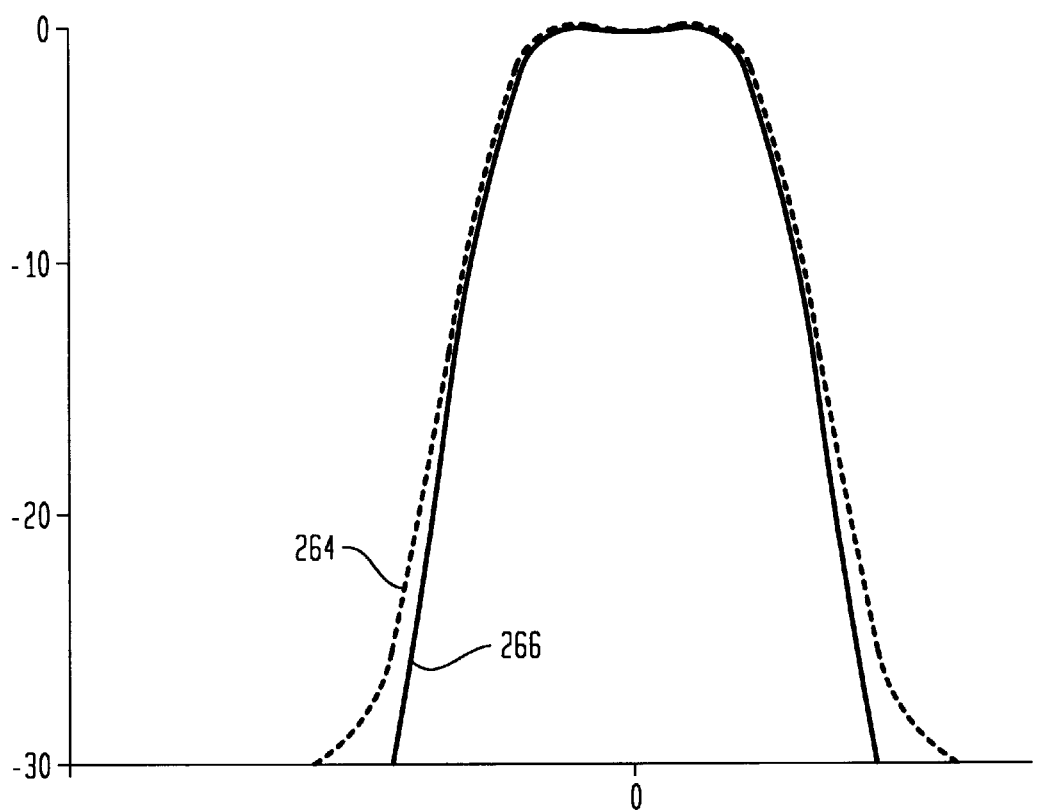
FIG. 12 illustrates a modified transmission coefficient obtained by the waveguide arrangement illustrated in FIG. 11.

To this end, FIG. 12 illustrates the improvement of transmission coefficients by employing the waveguide arrangement of FIG. 11 in accordance with one embodiment of the present invention. Thus, curve 264 is the plot of transmission coefficient of the waveguide arrangement described in reference with FIGS. 9a–9c. Curve 266 is the plot of the transmission coefficient of the waveguide arrangement configured in accordance with FIG. 11.

Thus, the routing device in accordance with the present invention may exhibit an improved transmission coefficient by coupling to its input port a waveguide that has a longitudinal slot near its output portion. This arrangement overcomes the radiation loss caused by the Y-branch arrangement in prior art systems, because the scattered power from the longitudinal slot may be employed in illuminating the waveguide's output aperture. By properly choosing the slot parameters, the two maxima of the input optical power distribution are readily optimized, so as to cause the transmission coefficient of the routing device exhibit a wide passband with negligible ripple. The scatted wave may cause some phase aberrations, which may affect the transmission coefficient. The phase aberrations may, however, be corrected as discussed above.

It is also noted that the techniques discussed above produce a prescribed passband ripple by means of a suitable slot inserted in the input waveguide. The same results may also be produced by employing a slot in the output waveguide. Furthermore, slots may be employed in both input and output waveguides in accordance with one embodiment of the present invention. In order to enhance the characteristics of the optical routing device spatial filtering techniques may also be employed as disclosed in the U.S. Pat. No. 5,467,418, issued on Nov. 14, 1995 and assigned to the same assignee as the present invention, and incorporated herein by reference. Generally, such spatial filtering may be achieved by modifying the length of the waveguides of the grating, and/or modifying the transmission loss in those waveguides. Thus, the present invention allows for a relatively large number of parameters that can be optimized so as to produce a desired ripple with reduced loss. In particular, identical slots in accordance with the present invention, may be introduced in the input and output waveguide of an optical routing device in a symmetric arrangement that employs the spatial filtering technique disclosed in the above-referenced U.S. Pat. No. 5,467,418.

Some of the advantages of the present invention include the relatively small size of the longitudinal slot. As a consequence the arrangement in accordance with the present invention is applicable to waveguide routing devices that have closely spaced input ports. Other advantages include the ability to control the optical input power distribution and the transmission coefficient more effectively and efficiently than previously allowed by prior art waveguide arrangements. Another advantage include the simple manufacturing steps necessary to fabricate the waveguide in accordance with the principles of the present invention.

While only certain features of the invention have been illustrated and described herein, many modifications, substitutions, changes or equivalents will now occur to those skilled in the art. It is therefore, to be understood that the appended claims are intended to cover all such modifications and changes that fall within the true spirit of the invention.

I claim:

1. An optical apparatus having a specifiable passband width comprising:
    a first free space region having at least one input port configured to receive light waves traveling through a first waveguide having an aperture configured to be coupled to said input port, said first waveguide further comprising a longitudinal slot extending inwardly within an end portion of said first waveguide from said aperture, said longitudinal slot having a given length, L, and width, S, so as to produce said specifiable passband width;
    an optical grating comprising a plurality of waveguides connected to said first free space region, said optical grating defined by a plurality of unequal length waveguides; and
    a second free space region coupled to said optical grating so as to receive light traveling through said optical grating, said second free space region further having at least one output port configured to provide light waves to a second waveguide coupled to said output port.

2. The apparatus in accordance with claim 1 wherein said longitudinal slot extends inwardly from the output aperture of said waveguide.

3. The apparatus in accordance with claim 2 wherein the refractive index of said longitudinal slot is lower than the refractive index of the core of said waveguide surrounding said longitudinal slot.

4. The apparatus in accordance with claim 1 wherein the optical waves reflecting from said longitudinal slot cause a given optical power distribution in the shape of a passband along the surface of the aperture of said first waveguide.

5. The apparatus in accordance with claim 4 wherein the value of length L of said longitudinal slot determines the transmission at two preselected wavelengths corresponding to two locations near respective edges of said optical power distribution.

6. The apparatus in accordance with claim 5, wherein said length L of said longitudinal slot has a value that maximizes transmission at said two preselected wavelengths corresponding to said locations near said respective edges.

7. The apparatus in accordance with claim 5 wherein the value of length L of said longitudinal slot is such that the waves reflecting from said longitudinal slot substantially illuminate the output aperture of said first waveguide.

8. The apparatus in accordance with claim 7 wherein the angle $\Theta_0$ of said waves reflecting from said longitudinal slot is substantially equal to the angle of incident rays impinging on said longitudinal slot.

9. The apparatus in accordance with claim 8 wherein said length L is substantially equal to $$\frac{W}{2\tan\Theta_o}$$

wherein W is the aperture width of said first waveguide.

10. The apparatus in accordance with claim 4, wherein said waves reflecting from said longitudinal slot reduces the amplitude of power in the center region of the aperture of said first waveguide.

11. The apparatus in accordance with claim 10 wherein a given ratio between the maximum power and minimum power amplitudes produced over the surface of said aperture corresponds to the value of the width S of said longitudinal slot.

12. The apparatus in accordance with claim 11, wherein said length L and said width S are varied to provide a desired power distribution over the surface of said aperture.

13. The apparatus in accordance with claim 2 wherein said slot has a nonuniform width.

14. The apparatus in accordance with claim 1, wherein said second waveguide further comprises a longitudinal slot, having a given length, L', and thickness, S'.

15. The apparatus in accordance with claim 14 wherein the length of the longitudinal slots in the first and second waveguide is substantially the same, and the thickness of the longitudinal slots in the first and second waveguides is substantially the same.

16. The apparatus in accordance with claim 1, wherein the length and transmission loss in the waveguides of said optical grating are modified so as to provide a specifiable passband width.

17. An optical apparatus having a specifiable passband width comprising:

a first free space region having at least one input port configured to receive light waves traveling through a first waveguide coupled to said input port, said first waveguide further comprising a longitudinal slot, having a given length, L, and width, S, so as to produce said specifiable passband width, wherein said first waveguide is tapered in the region surrounding said longitudinal slot;

an optical grating comprising a plurality of waveguides connected to said first free space region, said optical grating defined by a plurality of unequal length waveguides; and a second free space region coupled to said optical grating so as to receive light traveling through said optical grating, said second free space region further having at least one output port configured to provide light waves to a second waveguide coupled to said output port.

18. The apparatus in accordance with claim 17 wherein the refractive index of said longitudinal slot is lower than the refractive index of the core of said waveguide surrounding said longitudinal slot.

19. The apparatus in accordance with claim 18 wherein the optical waves reflecting from said longitudinal slot cause a given optical power distribution in the shape of a passband along the surface of the aperture of said first waveguide.

20. The apparatus in accordance with claim 19 wherein said waveguides of said optical grating have given lengths so as to substantially eliminate the phase variation of said optical power distribution.

21. A waveguide having a specifiable power distribution across its aperture comprising:

an enclosure wall defining an internal space of said waveguide; and a longitudinal slot extending inwardly within an end portion of said waveguide from said aperture, said longitudinal slot having a given length, L, and width, S, so that light emitting through said aperture obtains said specifiable power distribution.

22. The waveguide in accordance with claim 21 wherein the refractive index of said longitudinal slot is lower than the refractive index of said core surrounding said longitudinal slot.

23. The waveguide in accordance with claim 22 wherein the optical waves reflecting from said longitudinal slot cause a given optical power distribution in the shape of a passband along the surface of said aperture.

24. The waveguide in accordance with claim 23, wherein the value of length L of said longitudinal slot determines the amplitude of power at two preselected locations near respective edges of said optical power distribution.

25. The waveguide in accordance with claim 24, wherein said length L of said longitudinal slot has a value that maximizes the amplitude of power at said two preselected locations near said respective edges.

26. The waveguide in accordance with claim 23, wherein said waves reflecting from said longitudinal slot reduces the amplitude of power in the vicinity of the center region of said aperture.

27. The waveguide in accordance with claim 26 wherein a given ratio between the maximum power amplitudes produced over the surface of said aperture corresponds to the value of the width, S, of said longitudinal slot.

28. The waveguide in accordance with claim 27, wherein said length L and said width S are varied to provide a desired power distribution over the surface of said aperture.

29. The waveguide in accordance with claim 22 wherein said slot has a nonuniform width.

30. The waveguide in accordance with claim 21, further comprising:

a cladding layer disposed on the internal surface of the wall of said waveguide; and a core layer disposed adjacent said cladding layer, such that said cladding layer surrounds said core layer, and said longitudinal slot extends from said aperture through said core layer.

* * * * *